UNITED STATES PATENT OFFICE.

BERNARD H. SMITH, OF BROOKLYN, AND JOHN R. EOFF, JR., OF NEW YORK, N. Y., ASSIGNORS TO GARRETT & COMPANY, INC., A CORPORATION OF NEW YORK.

MANUFACTURING FLAVORING EXTRACTS WITH GLYCOLS.

1,384,681.      Specification of Letters Patent.      Patented July 12, 1921.

No Drawing.      Application filed July 26, 1920. Serial No. 399,090.

*To all whom it may concern:*

Be it known that we, BERNARD H. SMITH and JOHN R. EOFF, Jr., citizens of the United States, and residents of Brooklyn, in the county of Kings and State of New York, and New York city, in the county and State of New York, respectively, have invented certain new and useful Improvements in Manufacturing Flavoring Extracts with Glycols, of which the following is a full, clear, and exact specification.

This invention relates to flavoring extracts, and has for its object to provide for the preparation of such extracts by the use of the glycols, either ethylene glycol, $C_2H_4(OH)_2$, or propylene glycol, $C_3H_6(OH)_2$, separately or together, and with or without water as a diluting material, as solvents for the flavoring materials. This invention also contemplates the use of admixtures of these glycols with other solvents, such as ethyl alcohol, ethyl acetate and the higher alcohols of the paraffin series, including propyl, butyl and amyl alcohols, in the manufacture of flavoring extracts.

Ethylene glycol and propylene glycol are miscible in all proportions with themselves and with ethyl alcohol, glycerin, iso-propyl alcohol and water. Ethylene glycol alone is preferred, but propylene glycol, the two glycols together or admixtures of either or both with any of the other alcohols mentioned may also be used.

Various flavoring extracts may be made in accordance with this invention, such as apricot, peach, apple, almond, pear, celery, cassia, allspice and anise, etc. The invention is especially applicable to the preparation of vanilla extract, and for the purpose of examples the specific ways of preparing vanilla extract will be herein explained.

*First method.*—We may take the usual extract of vanilla with ethyl alcohol, evaporate off the ethyl alcohol from the extracted material, preferably in partial vacuum, and redissolve the extracted material in glycol, either pure or diluted with water. It is better to dissolve in the desired amount of undiluted glycol first, and then add the desired quantity of water, instead of dissolving directly in the diluted glycol.

*Second method.*—The extract from the vanilla beans may be made in any of the usual well known ways but instead of using ethyl alcohol alone, a mixture of glycol, water and ethyl alcohol may be employed. The ethyl alcohol may be then evaporated off, and the residue diluted to the desired strength either with glycol or water, or both.

*Third method.*—The vanilla beans may be treated directly with pure or diluted glycol, using the percolation, digestion or maceration method of extraction.

In these several methods we have found the best results are obtained by using approximately 10% of vanilla beans with about 90% of glycol either undiluted or in water solution containing from 40% up of glycol. Even when the mixture of glycol and water contains as little as 40% glycol, a full strength vanilla extract can be made which is clear and brilliant, and the same is true with all strengths of the glycol solution up to 100%.

Extracts prepared in accordance with this invention by the use of glycol as the solvent, are greatly superior to those made from glycerin in that they produce clearer and more brilliant solutions. The glycol solutions are also less viscous and heavy than the glycerin solutions and are accordingly more nearly like the ethyl alcohol solutions. The color of the glycol solutions is also superior to that of the glycerin solutions. The discovery that the glycols may be used as solvents for flavoring extracts is an important consideration also in view of the present high price and restrictions upon the use of ethyl alcohol.

While we have specified herein the preferred proportions of flavoring materials, glycols and water, it will be understood that said proportions may be varied without departing from this invention.

Having thus described our invention, what we claim as new and desire to secure by Letters Patent of the United States is:—

1. A flavoring extract consisting of a flavoring material dissolved in a glycol.
2. A flavoring extract consisting of a flavoring material dissolved in ethylene glycol.
3. A flavoring extract consisting of a flavoring material dissolved in an admixture of glycol and another solvent.
4. A flavoring extract consisting of a flavoring material dissolved in an admixture of glycol and another alcoholic solvent.

5. A flavoring extract consisting of a flavoring material dissolved in an admixture of ethylene glycol and another solvent.

6. A process of preparing a flavoring extract which consists in evaporating off the ethyl alcohol from an ethyl alcohol extract of the flavoring material, then redissolving the extracted flavoring material in glycol.

7. A process of preparing a flavoring extract which consists in extracting the flavoring material with a mixture of glycol and ethyl alcohol, and then evaporating off the ethyl alcohol.

8. A process of preparing a flavoring extract which consists in extracting the flavoring material with a mixture of glycol and ethyl alcohol, then evaporating off the ethyl alcohol, and finally diluting the residue with glycol.

9. A flavoring extract consisting of flavoring material extracted with glycol in substantially the proportions of 10% flavoring material and 90% glycol.

10. A flavoring extract consisting of flavoring material extracted with a solution of glycol and water in substantially the proportions of 10% flavoring material and 90% glycol solution, said solution containing between 40% and 100% of glycol.

In testimony whereof we have signed our names to this specification.

BERNARD H. SMITH.
JOHN R. EOFF, Jr.